US012808356B1

(12) United States Patent
Kress

(10) Patent No.: US 12,808,356 B1
(45) Date of Patent: Nov. 24, 2026

(54) SEALED OSCILLATING PRESSURE ENGINE

(71) Applicant: Nathan Kress, Sarasota, FL (US)

(72) Inventor: Nathan Kress, Sarasota, FL (US)

( * ) Notice: Subject to any disclaimer, the term of this patent is extended or adjusted under 35 U.S.C. 154(b) by 8 days.

(21) Appl. No.: 19/334,976

(22) Filed: Sep. 22, 2025

Related U.S. Application Data

(60) Provisional application No. 63/856,690, filed on Aug. 3, 2025.

(51) Int. Cl.
*F03G 7/10* (2006.01)

(52) U.S. Cl.
CPC ............... *F03G 7/115* (2021.08); *Y10S 74/09* (2013.01); *Y10S 415/916* (2013.01)

(58) Field of Classification Search
CPC ...... H02K 53/00; Y10S 74/09; Y10S 415/916
See application file for complete search history.

(56) References Cited

U.S. PATENT DOCUMENTS 5,554,922 A * 9/1996 Kunkel .................... H02N 2/18 322/3
8,143,766 B2 * 3/2012 Namuduri .............. H02N 2/186 310/339
12,006,919 B2 * 6/2024 Jaccard ................... F03G 1/022
2013/0238073 A1 * 9/2013 Makdissi ........... A61N 1/36542 607/126
2018/0313323 A1 * 11/2018 Grubel .................. F03B 13/264
2024/0159211 A1 * 5/2024 Pan ......................... F03B 13/20

FOREIGN PATENT DOCUMENTS

CN 114623037 A * 6/2022 ............... F03G 3/06
WO WO-2018215890 A1 * 11/2018 ............... F03D 5/06

* cited by examiner

*Primary Examiner* — Thomas E Lazo

(57) ABSTRACT

A sealed mechanical energy system is disclosed, comprising a gas-tight housing containing two or more rigid plates joined by one or more flexible pivot joints to form a V-shaped or oscillating structure. The plates are actuated by spring assemblies, magnetic repulsion mechanisms, or combinations thereof, which store and release energy during cyclical transitions between upward- and downward-facing V configurations. The system includes sealing membranes affixed around moving joints and plate perimeters to isolate upper and lower gas chambers within the housing, enabling sustained oscillatory motion through internal pressure differentials and restoring forces. Linear motion of the plates and springs is converted into rotational or electrical energy via mechanical motion converters, allowing the device to power alternators, vehicle drivetrains, or machinery. Variants include asymmetrical spring configurations, magnetic alternatives, central third-plate stabilizers, gas rebalancing systems, and motion limiters. The invention offers a clean, scalable, and durable energy source for both many applications.

17 Claims, 3 Drawing Sheets

SEALED OSCILLATING PRESSURE ENGINE

CROSS-REFERENCE TO RELATED APPLICATIONS

This application claims the benefit of U.S. Provisional Application No. 63/856,690, filed on Aug. 3, 2025, entitled "Pressure-Differential Driven Zig-Zag Mechanical Power Generator." The entire disclosure of the referenced application is hereby incorporated by reference.

FIELD OF INVENTION

The present invention relates generally to mechanical energy systems, and more particularly to sealed oscillating mechanical energy devices that convert gas pressure differentials and mechanical restoring forces into repeatable, harvestable motion. The invention further relates to energy systems that operate without combustion or external electrical input, and that can generate mechanical or rotational power through internally driven oscillations in a sealed environment.

BACKGROUND

Traditional mechanical energy generation systems, such as internal combustion engines or electrically driven motors, typically rely on external fuel sources or electrical input to produce motion. These systems often include complex ignition, fuel injection, or control circuits, and may produce greenhouse gas emissions, require frequent maintenance, and involve significant wear due to moving parts in contact under load. Additionally, many known mechanical oscillators or pressure-driven devices require external actuation, exhibit limited operational lifespans, or cannot maintain airtight isolation between functional chambers, limiting their use in autonomous or environmentally sealed applications.

Various attempts have been made to produce self-sustaining oscillatory systems based on pressure differentials, bistable geometries, or spring-driven mechanisms. However, such systems often suffer from inherent inefficiencies, unbalanced motion, gas leakage, or rapid mechanical degradation due to wear at joints or seals. Prior art in the field of sealed mechanical oscillators typically fails to provide long-term, maintenance-free operation while also producing usable rotary energy for practical applications such as electricity generation, vehicle propulsion, or tool operation. Moreover, existing solutions rarely incorporate methods for synchronized motion control, internal pressure balancing, or modular scalability—all of which are critical for efficient, real-world deployment.

Therefore, a need exists for a robust, self-contained, sealed mechanical energy system capable of converting internal pressure fluctuations and spring or magnetic restoring forces into continuous oscillatory motion. The system should be capable of high durability, minimal energy loss, and stable operation over extended durations, with configurations that support rotational energy harvesting and application across a variety of mobile and stationary platforms. The present invention addresses these and other deficiencies in the prior art.

SUMMARY OF THE INVENTION

The present invention relates to a sealed mechanical energy generation system that converts internal gas pressure differentials and restoring forces from springs or magnetic repulsion into sustained oscillatory motion and usable mechanical or electrical output. Housed within a rigid structure—typically cube-shaped or compactly modified—the system consists of two primary plates joined by a flexible, gas-sealed central hinge. These plates are actuated by one or more spring or magnetic assemblies mounted on opposing internal walls, enabling the plates to pivot between upward- and downward-facing V-shaped configurations in response to pressure forces within upper and lower gas chambers.

As the internal plates oscillate, they alternately compress and decompress the restoring elements (e.g., springs or repelling magnets), generating a repeating mechanical cycle without the need for combustion, electronics, or external power input beyond initial priming. The motion is entirely self-sustaining so long as the internal pressure differential and mechanical resilience remain intact. The linear or angular motion of the internal components is captured via conversion mechanisms—such as alternators, crankshafts, or geared linkages—to produce rotary or electrical energy for external use. This output can power vehicles, tools, off-grid systems, or stationary equipment, offering a clean and potentially long-duration source of mechanical energy.

The invention includes numerous structural and functional variants, including configurations with a third central plate for synchronized motion, asymmetric spring setups for reduced wear, pressure-rebalancing valves, refillable or self-contained gas systems, mechanical locking mechanisms for timed release cycles, and integrated control systems for dynamic regulation of oscillation. The design further accommodates various sealing strategies—such as flexible membranes, articulated joints, and reinforced gaskets—to maintain long-term airtight performance while preserving mechanical flexibility.

The system is modular, scalable, and adaptable to diverse power applications, from microdevices to high-torque industrial systems. It produces no emissions, requires no external refueling, and is capable of operating indefinitely within a closed environment, making it a compelling alternative or supplement to conventional fossil fuel or battery-based technologies.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention. All figures are shown as cutaway or cross-sectional views for illustrative clarity, revealing internal components of the sealed apparatus that would otherwise be enclosed within an external housing.

DETAILED DESCRIPTION OF THE DRAWINGS

The accompanying drawings illustrate embodiments of the invention and, together with the detailed description, serve to explain the principles of the invention. Each figure is presented as a cutaway or sectioned view, showing internal components and mechanisms that would otherwise be enclosed by the external walls of the apparatus.

Figure 1:
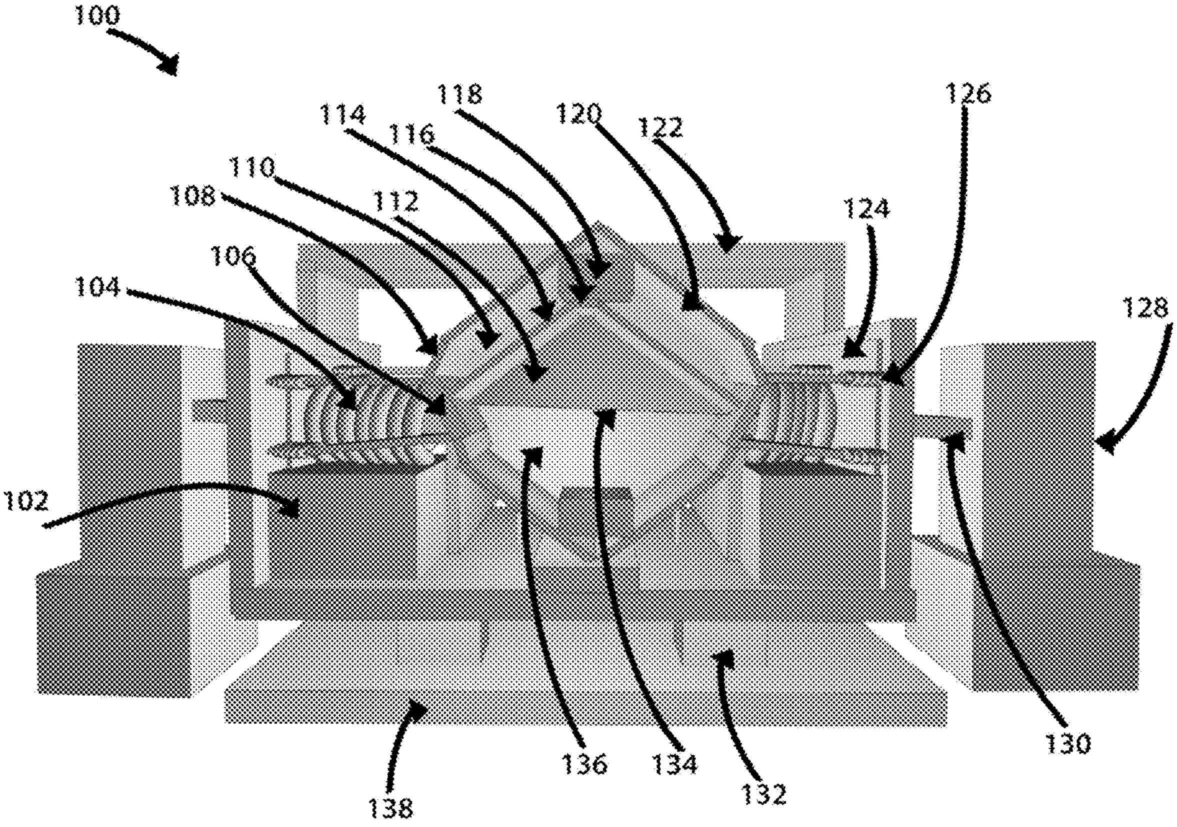
FIG. 1 is a perspective cross-sectional view of a first embodiment of the sealed oscillating apparatus, showing a dual-plate V-shaped configuration actuated by springs on opposing sides within a cube-shaped housing, and including motion restriction and mechanical-to-rotary energy conversion components.

FIG. 1 illustrates a V-shaped dual-chamber embodiment of the oscillating pressure-driven apparatus, designed to transform gas pressure and spring-induced motion into mechanical rotation. The machine 100 comprises a support platform 138 on which the entire assembly rests, lifted by sturdy legs 132 for structural elevation. The main housing includes a rigid supporting cube 102 that secures the left-side spring assembly 104 and ensures its stable horizontal alignment. The springs 104 are connected to spring plates 106, which in turn interface with the left V-forming plate 114. A mechanical seal 108 is positioned between the spring plate and the V plate to ensure pressure retention. A flexible sealing structure 112 is attached along the perimeter of the plates and interior chamber, maintaining isolation between the upper gas chamber 110 and the lower gas chamber 136. The V configuration is formed by the pivotable joint 116 connecting the left plate 114 to the opposing plate, not explicitly labeled in this figure. A motion restrictor 118 is fixed to the top of the container to prevent excessive compression of the V-formation. The upper wall 120 and roof support 122 reinforce the structure. On the right-hand side, the spring track 126 ensures linear compression, while the right spring connects to a mechanical energy converter 128, which in transforms linear motion into rotation and transmits it through connector 130 to an alternator or generator. The right spring backs up against a fixed wall 124, all supported structurally by the base 138. A full perimeter seal 134 is shown encircling the middle of the chamber.

Figure 2:
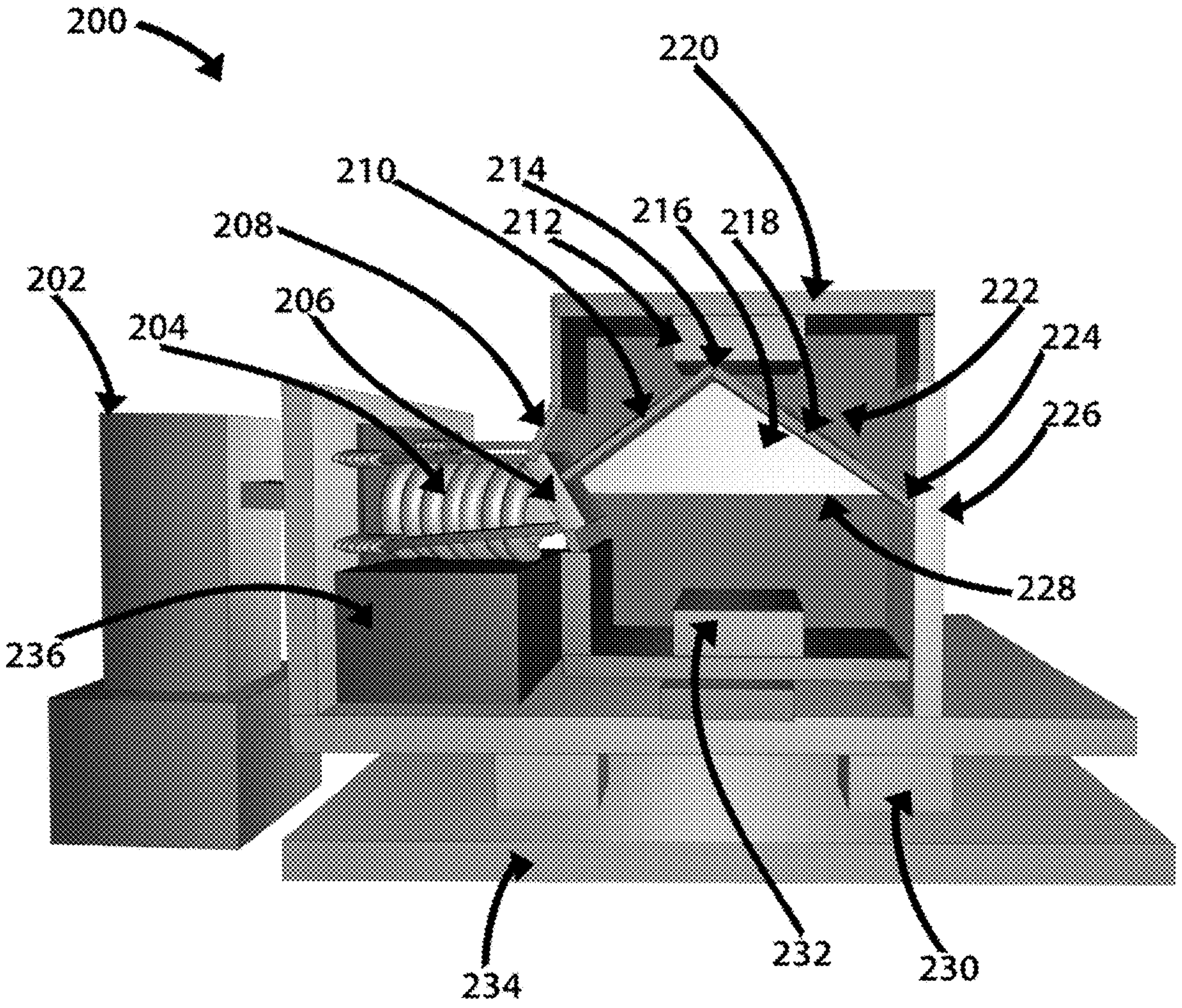
FIG. 2 is a side cross-sectional view of a second embodiment of the apparatus, illustrating an asymmetric configuration with a single active spring, simplified structural design, internal motion limiters, and a continuous gas-sealing membrane between upper and lower chambers.

FIG. 2 illustrates a similar system 200 with a cubic gas chamber instead of a V-shaped container. This figure is also depicted as a cutaway sectional view, allowing the viewer to observe the internal gas chambers and mechanisms. It omits the right-side spring, showing a fixed wall 226 instead. The left spring 204 remains active and compresses against a secure frame 236. The spring plate 206 is connected to the left oscillating plate 210 via a seal 208. The plate 210 forms part of a V-shape joined to a right-side plate 218 via a pivotable and sealed joint 214. The middle joint 216 both flexes and seals the connection between the two plates. A fixed wall connection 224 anchors the right plate. A flexible membrane 228 stretches across the middle interior wall to maintain sealed separation between the upper gas chamber 222 and the lower chamber (not labeled but implied). The restrictor block 232 is fixed to the top interior to prevent the V from collapsing too far. The motion of the spring transfers to the converter 202, which generates circular energy for output. The structure rests on a rigid base 234 supported by legs 230.

Figure 3:
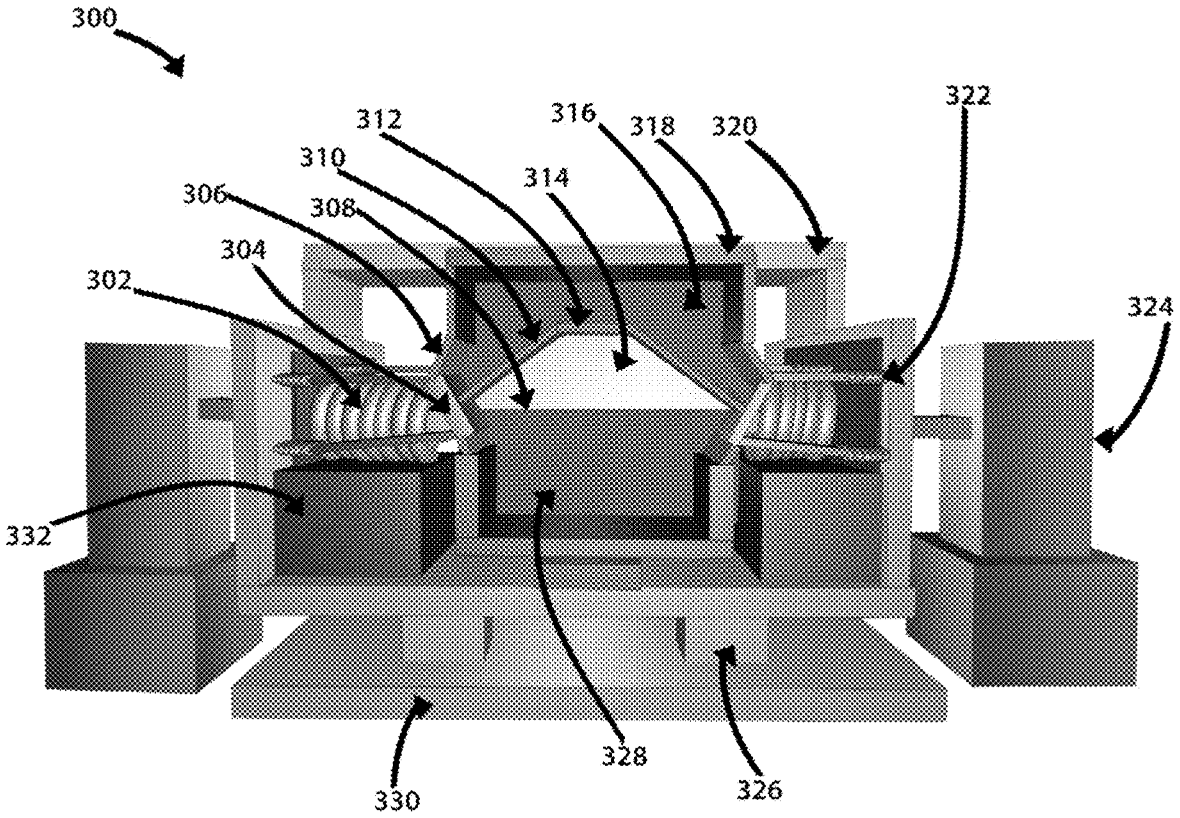
FIG. 3 is a perspective cross-sectional view of a third embodiment, incorporating a central third plate connected between two outer plates to enable synchronized pivoting, enhanced structural balance, and improved motion stability during oscillation, while maintaining internal gas separation and energy conversion elements.

FIG. 3 depicts a cube-based version 300 of the apparatus with a third central plate 312 located between the left plate and right plate. Like the others, this figure is shown as a cutaway view, making the interior components visible through the removal of one outer wall surface. The springs 302 connect to spring plates 304, which connect via sealed joints 306 to the oscillating left plate (not labeled). The left and right plates are joined via pivot joints to the center plate 312. A gas-tight flexible joint 314 connects all three plates and seals the interior. This design allows for synchronized tilting through the central plate, which helps balance motion. The upper gas chamber 316 is currently at higher pressure than the lower chamber 328 due to V intrusion, driving the plates downward. As pressure builds, it compresses the springs 302 along a linear track 322. The spring motion is translated to the alternator box 324, which converts it to electrical or rotary energy. A roof structure 320 stabilizes the entire cube, which rests on base 330 elevated by support legs 326. The cube body includes structural elements 318 (upper wall) and 332 (spring housing). The sealing structure 308 conforms around all moving and stationary components to maintain airtight conditions and isolate the two gas chambers.

These figures together illustrate different embodiments of the invention described, including one with bidirectional spring compression and alternating motion (FIG. 1), a simplified asymmetrical spring configuration (FIG. 2), and a triple-plate synchronized design for improved motion stability (FIG. 3). All versions share the core principles of sealed oscillating motion driven by internal gas pressure differentials and mechanical restoring forces, with energy extracted through motion converters for external use.

DETAILED DESCRIPTION

This invention is a sealed mechanical energy system housed within a durable, cube-shaped structure. The core physical configuration of the invention includes two spring assemblies that are mounted symmetrically on opposing sides of the cube, each centered vertically in the middle region of its respective wall to ensure balanced force application during operation. Each spring is positioned along a horizontal axis and extends into the interior of the cube through a circular or rectangular opening centered on its respective wall. These springs are mounted on precisely machined linear guide rails or slots that prevent any form of rotational movement and constrain the motion exclusively to a back-and-forth translation along a straight line.

Attached to the inner end of each spring is a sturdy, rigid support plate, which may be made from metal or any other durable material capable of resisting wear, deformation, and gas exposure over time, such as reinforced composites or high-performance polymers. This plate is connected to the spring via a pivoting joint. This joint allows the plate to rotate or tilt in response to the spring's movement. These two plates are aligned in the same horizontal plane and are joined at their inner edges via a second high-strength, flexible pivoting joint or hinge. This joint is critical, as it allows the two plates to pivot relative to each other, forming either an upward-facing V shape or a downward-facing V shape. The flexibility of the joint is specifically engineered to maintain high durability under repeated oscillation, while also enabling rapid transitions between configurations with minimal resistance.

To preserve the airtight integrity of the system while still allowing the plates to move and flex, a sealing structure is affixed to the outer edges of the plates, the structure comprising any flexible or compliant material or mechanical arrangement capable of maintaining a continuous gas-tight seal while allowing for plate movement. This may include, but is not limited to, flexible membranes, metal bellows, articulated gaskets, foldable joints, reinforced polymer sheeting, or any equivalent sealing assembly designed to conform to dynamic plate motion and preserve chamber isolation. This sealing structure extends outward from the perimeter of each plate to meet the internal surfaces of the cube at a midpoint location along each inner wall, not just around the wall openings. This configuration allows the seal to form a near-flat horizontal partition across the interior of the cube when the springs are fully compressed, while still accommodating the folding or flexing needed when the plates move into a V shape during decompression. To achieve this dynamic range of movement, the flexible or stretchable material must include sufficient slack or extra length to allow it to extend and retract without tearing or restricting motion, ensuring the membrane can span the full area when the plates flatten and fold accordingly when the plates shift shape. Additional sealing components are also incorporated around each pivoting joint-between the spring and its connected plate, between the plate-to-plate connection at the center, and between the spring housing and the cube wall. These collectively ensure that all moving and tilting elements maintain a continuous, leak-proof barrier between the two chambers, while still allowing for full mechanical motion during operation. Additionally, the membrane extends around the perimeter of the plates and along the flexible joint, ensuring complete separation between the two internal chambers of the cube. Each of these chambers is filled with an equal volume of a compressible gas, such as air, nitrogen, or another inert substance. In alternative implementations, the spring assemblies may be replaced by or supplemented with repelling magnetic systems. These may include permanent magnets configured with like poles facing each other to generate a repulsive force, thereby mimicking the function of mechanical springs without wear or fatigue. Additionally, electromagnets may be used in place of or alongside traditional springs, allowing the repelling force to be dynamically controlled via electronic signals. This adjustable configuration enables real-time tuning of oscillation behavior based on system conditions, offering improved efficiency, responsiveness, and longevity. Both permanent and electromagnet-based designs may be integrated into any variant or base version of the invention as a substitute for or complement to physical springs.

In all implementations of the invention, the joints connecting the plates-whether between the spring plate and its associated arm or between the two central plates-represent critical locations where gas could potentially escape if not properly sealed. To prevent this, a flexible sealing membrane or elastic gasket material is applied over and around each joint, especially where two plates pivot or tilt relative to one another. These sealing materials must be capable of bending and folding repeatedly without tearing, delaminating, or losing adherence, and may include multi-layer polymer composites, fabric-reinforced elastomers, or metalized films with high flexural fatigue resistance. In the preferred embodiment, the sealing structures are applied directly to the joints or perimeter edges of the oscillating plates and other movable components, forming independent localized seals that flex with the motion while maintaining gas isolation. These seals do not span larger areas or connect to broader membranes, offering a simple and robust way to preserve chamber separation without introducing excess material complexity. However, in alternative embodiments, the sealing material may be configured as part of an extended flexible membrane, forming a continuous surface that covers not only the joints but also connects with the outer chamber wall or plate edges, thereby enabling integrated motion and pressure sealing. To secure these materials to the plates or chamber walls, several attachment methods may be used: industrial adhesives formulated for gas-tight bonding, embedded retention channels molded into the plate surface, heat-sealed or solvent-welded seams, or mechanical clamps and fasteners placed outside the range of motion. The membrane itself may span across pivot joints in a bellows-like or accordion-fold configuration, accommodating angular displacement while preserving internal pressure. In versions utilizing broader sealing membranes, the flexible barrier between the plate edges and the inner chamber wall may be affixed using mechanical flanges, groove-lock inserts, compression rings, or integrally molded weld lips. These sealing methods—whether localized or extended—are all compatible with the principles of the invention and may be chosen based on desired performance, material properties, or manufacturing preferences. While applying sealing material symmetrically to both sides may introduce balancing forces that could reduce net pressure differentials, the design compensates through the action of the springs and the asymmetric shape of the V-structure during motion. In certain implementations, internal chamber pressure alone may assist in maintaining directional force, allowing for the use of balanced sealing structures without performance loss. These sealing strategies are applicable across all variants of the invention and form a fundamental part of maintaining long-duration airtight operation.

Before operation begins, the plates naturally rest in a V-shaped configuration-either upward- or downward-facing—because the springs are designed to resist remaining in a fully compressed state. Due to their mechanical properties, the springs exert a force that biases the plates away from a flat alignment and into an angled, energy-storing position. The flexibility of the plate joints and the spring preload cause the system to settle in this V configuration when undisturbed.

The function of the invention begins when either the upward or downward V shape is pushed further into one of the chambers, reducing the volume on that side and thereby increasing the gas pressure within that chamber. This increase in pressure causes a force to build that opposes the current position of the plates. As the internal pressure pushes against the V-shaped structure, both springs are simultaneously compressed, causing the plates to move toward a flattened position. At the moment when the plates become temporarily flat, the combined momentum of the gas pressure and the mechanical drive from the compressed springs causes the structure to overshoot the flat alignment and continue into the opposite V-shaped configuration. As this occurs, the springs transition from their maximum compressed state during the flat moment and begin to decompress, helping drive the plates into their new V configuration. This smooth and continuous transition from V to flat to opposing V is essential to the back-and-forth motion of the invention. As the plates pivot and reorient, the compressed spring decompresses, and the opposing spring becomes compressed, storing energy for the next cycle.

This alternating flexing action continues as long as there is sufficient internal pressure differential and spring force balance. The result is a self-sustaining mechanical oscillation where the internal plates move back and forth in a repeating cycle, driven solely by internal pressure dynamics and mechanical resilience. Because the system is sealed and no external energy input is needed beyond initial priming, this mechanism presents a promising approach to long-duration, low-maintenance motion generation.

The linear motion of the springs and plates can be harnessed for useful work by connecting one or both spring assemblies to a motion conversion mechanism. For example, a crank-slider linkage, gear system, or camshaft can be used to transform the reciprocating linear motion into rotary motion. This rotary energy can then be used to drive an electric generator, alternator, or dynamo to produce electrical power. In automotive applications, the alternator output may be used to charge a battery or directly power an electric motor, enabling a vehicle to be propelled through conventional electric drivetrain systems. The invention's continuous mechanical motion, once converted and regulated, serves as a steady and renewable energy source for powering electric vehicles in whole or in part. Alternatively, the rotational motion can be applied directly to drive axles, propellers, or rotary tools such as fans, drills, or cutting machines. The invention is therefore capable of serving as a power source in standalone generators, mobile electric vehicles, or low-energy mechanical systems. In addition to electrical generation, the rotary mechanical motion produced by this system can be directly coupled to a drivetrain for powering a vehicle's wheels through mechanical transmission. By using a gear-based system, belt drive, or axle interface, the oscillation-converted rotation can drive the wheels of a car, utility cart, or other ground vehicle. A mechanical or electromechanical control system—such as a variable clutch, transmission gear selector, or computer-controlled throttle—can be integrated to manage acceleration, deceleration, stopping, and directional control. This enables the vehicle to respond to operator commands or autonomous logic while remaining powered by the sealed mechanical motion engine described above. The same rotational output may also be adapted for use in lightweight helicopters or other vertical takeoff aircraft, either by directly powering the rotor system through a mechanical gearbox or by supplying power to electric motors that drive lift-generating blades. Additionally, the invention can be scaled or configured to operate heavy machinery that requires consistent torque, such as hydraulic systems, industrial processing equipment, or stationary power units. With the appropriate motion conversion and control interfaces, the invention offers a potential energy solution for both mobile and stationary applications demanding high-performance mechanical or electrical output.

In various implementations, both spring assemblies may be mechanically coupled to a single shared energy conversion system, such as a common crankshaft, flywheel, or alternator, to produce unified rotational output. Alternatively, each spring may be connected to its own independent motion converter, enabling separate mechanical outputs that can be used to power different components or subsystems. This separation allows for dual-functionality or redundancy, such as driving multiple electrical generators, actuating separate mechanical tools, or operating independent vehicle drive systems. The configuration may be selected based on system demands, application type, or desired load balancing between the two output pathways.

To enhance operational control and efficiency, the invention may also include an optional locking mechanism on one or both spring assemblies. These locks may be mechanical or electromechanical in nature and can temporarily restrict motion at specific points in the oscillation cycle. For example, the locks could hold the system in a compressed position, allowing energy to accumulate before being released in a controlled burst. This produces a more consistent and tunable oscillation frequency, which can be synchronized with external systems via timers or sensors. The inclusion of a locking and release cycle can be particularly beneficial in applications where precision timing or power consistency is important, such as signal generation or regulated power output.

In certain implementations, the locking and unlocking of the spring assemblies may be governed by an electronic control unit or software-based controller. This control unit may utilize input from pressure sensors, motion detectors, or timing circuits to dynamically regulate the oscillation cycle. The controller can adjust the frequency, duration, or number of flips within a given timeframe, enabling applications that require precise timing, variable energy output, or integration with broader system logic. Such electronic or software-controlled timing systems may also communicate with external devices to coordinate operation in multi-unit arrays or synchronize energy output with external loads.

A first variant of the invention modifies the shape of the housing and the internal structure. Rather than using a complete cube, this variant employs a more compact form that contains only the two V-shaped plates, without the enclosing cube structure. The gas chambers are still present, but they are confined to the space above and below the V shape. In this simplified configuration, the plates are still joined by the same flexible joint, and the spring assemblies function in the same way. The sealing membrane continues to isolate the two gas volumes, maintaining airtight separation and enabling oscillation. This shape-focused variant may improve the speed and efficiency of the motion cycle due to reduced internal volume and faster pressure equalization. It also allows for a more lightweight and potentially more portable implementation.

A second variant introduces a limiting structure inside the housing to prevent excessive compression of the plates. In this version, separate physical limiters are mounted inside the cube: one on the top interior surface and another on the bottom interior surface, aligned along the central axis of the plates but not physically connected to each other. These limiters function as hard stops that restrict how far the V-shaped plates can compress inward during oscillation, helping to prevent over-collapse or jamming without requiring a single continuous post between the top and bottom. This post physically obstructs the plates from folding too far inward, which might otherwise cause them to become stuck or reduce the effectiveness of the spring rebound. The limiter ensures that the system remains within a functional range of motion, optimizing both the consistency and longevity of the oscillating action. This variant does not alter the rest of the mechanism, which continues to operate with the same springs, flexible joints, and sealing membranes as the original design.

These two variants can be used individually or in combination. For example, the more compact V-only version described in the first variant can also benefit from the internal limiter of the second variant to prevent plate over-compression. Additionally, the locking mechanism described earlier can be applied to either of these variants. The sealing membrane design, flexible joint material, and energy conversion components can also be used interchangeably across all versions.

For example, the more compact V-only version described in the first variant can also benefit from the internal limiter of the second variant to prevent plate over-compression. Additionally, the locking mechanism described earlier can be applied to either of these variants. The sealing membrane design, flexible joint material, and energy conversion components can also be used interchangeably across all versions.

A third variant modifies the spring configuration to allow only one spring to compress at a time while the other remains mostly uncompressed. In this version, the spring assemblies are tuned or mechanically configured so that as the internal pressure pushes the V-shape toward a flat orientation, only the spring facing the high-pressure side contracts significantly. The opposite spring remains mostly extended, offering minimal resistance. This asymmetry allows the plates to flatten gradually and flip into the opposite V configuration by using the stored energy in just one spring. As the flipping occurs, the compressed spring rapidly decompresses and drives the plates fully into the new V orientation, while the opposite spring resets to its initial position. This version simplifies the transition by relying on a single-sided compression at each phase of motion. The rest of the system-including the flexible plate joint, sealing structure, and gas-filled chambers-remains unchanged. This configuration can reduce the wear on the spring assemblies by alternating which side undergoes full compression, potentially improving lifespan. It may also be combined with the limiter described in the second variant, as well as with the compact geometry of the first variant, depending on desired performance characteristics.

A fourth variant introduces a way to maintain proper gas levels within the sealed chambers over time. In this version, one or more external gas reservoirs are connected to the system via small, sealed inlet ports. These ports are equipped with one-way check valves or pressure-regulated valves that allow gas to be introduced into either chamber if a drop in pressure due to leakage is detected. The refill system may operate manually, mechanically, or automatically based on pressure sensors that monitor each chamber's gas level. This configuration ensures that the oscillation remains stable even over extended use and compensates for slow leaks without requiring full system disassembly.

A fifth variant provides a method of balancing gas between the two chambers without introducing external gas. This is achieved using a sealed, bidirectional flow valve positioned along the interior wall that separates the chambers or along a bypass conduit connected to both sides. The valve remains sealed under normal operation but can be activated mechanically or electronically to release excess gas from the chamber with higher pressure into the chamber with lower pressure. This rebalancing mechanism restores equilibrium and keeps the system oscillating symmetrically. It is especially useful in long-duration sealed environments where perfect gas isolation is difficult to maintain. This internal balancing mechanism can be integrated into the base model or combined with the fourth variant's refill approach for redundancy.

A sixth variant incorporates a third plate positioned between the two main pivoting plates. This third plate serves as a central spine or linkage point that connects both outer plates. In this configuration, each of the two V-forming plates is connected to the middle plate via a pivoting joint rather than being directly joined to one another. This design adds structural synchronization and helps prevent one plate from shifting independently or ahead of the other. To further ensure coordinated movement, a coupling mechanism—such as a balancing spring, mechanical arm, or tensioned tether—may be added between the two outer plates. This component resists asymmetric displacement and encourages the plates to move in unison or with controlled delay, improving symmetry and timing during each oscillation. Additional design options for this variant may include a three-way hinge system with resistance bias, or a central torque equalizer that distributes angular motion equally across both outer plates. The rest of the system remains unchanged and may still include sealing membranes, gas balancing features, or internal limiters, depending on the use case.

A seventh variant addresses the same issue of asynchronous plate movement by modifying the central flexible joint that connects the two primary plates in the base invention. In this design, the joint itself is configured to prevent one side of the plate assembly from pivoting without the other also responding. This may be achieved by using an interlocking or mechanically synchronized joint structure—such as a dual-axis torque-transfer hinge, internal cam-followers, or a mechanical clutch system—that binds the motion of the two plates together. When one plate begins to rotate due to pressure and spring compression, the mechanism ensures that an equal and opposite or proportionally matched motion occurs on the other plate, maintaining symmetric or balanced motion across the centerline of the cube. This integrated motion coordination system can significantly enhance timing reliability and prevent partial flipping or stalling that could otherwise occur due to uneven resistance or material wear. The synchronized joint can be constructed from durable, low-friction materials and may include embedded tension-balancing springs or rotational biasing components. This variant is especially useful in high-performance or precision-timed implementations of the invention where uniform plate motion is critical to energy harvesting or mechanical consistency.

Another variant, not illustrated in the figures, replaces the V-shaped plates with one or more sets of dual or multi-rod assemblies that functionally replicate the flexing motion of the plates. These rods are arranged in angular or hinged patterns to enable synchronized pivoting in response to internal gas pressure. The rods are joined with gas-sealed, flexible pivot joints and connected to one another in a way that ensures coordinated movement-such that when one joint shifts, the others respond proportionally. Sealing structures, similar to those used around the plates in other embodiments, are integrated around and between the rods to maintain an airtight barrier between the upper and lower gas chambers. This configuration provides the same pressure-driven oscillating behavior as the plate-based versions while allowing for alternative geometries and mechanical designs suited to manufacturing or application-specific constraints. All versions share the core principles of sealed oscillating motion driven by internal gas pressure differentials and mechanical restoring forces, with energy extracted through motion converters for external use.

To address the same challenge of unsynchronized movement within the core invention itself (without using a third plate), a mechanical interlinking approach may be integrated. This involves adding a cross-coupling feature—such as a linking rod, calibrated spring, or internal rack system—that distributes the force applied to one spring to the opposite spring in a controlled ratio. The purpose is to reduce the risk of one spring fully or partially compressing without the other responding equally, which could otherwise disrupt the flat-to-V transition. This correction mechanism ensures balanced compression and decompression timing and improves the overall efficiency and durability of the oscillation. This solution may be integrated directly into the base configuration or combined with any of the previously described variants.

Another variant of the invention eliminates one of the spring assemblies and instead utilizes a solid interior wall with no openings, penetrations, or spring mounts-only a centrally placed sealed hinge or pivot joint that directly connects to the adjacent plate. This joint may consist of a flexible hinge, compliant connector, or mechanical pivot integrated into the chamber wall, allowing the plate to pivot or flex without relying on a second spring for compression.

The corresponding plate is anchored to this wall-mounted joint, enabling full tilting motion while acting as a passive support. The opposite plate remains coupled to a spring or magnetic repelling mechanism, which continues to provide the restoring force necessary for oscillation. This configuration simplifies the system's mechanical dynamics by eliminating the possibility of mismatched compression between two active springs. Movement initiated on the spring-connected side automatically drives a mirrored motion on the hinged side due to the central plate coupling, maintaining synchronized behavior of the V-shape structure. The sealing membranes extend around all pivoting joints and plate edges, preserving the gas-tight division between the upper and lower chambers. The oscillating motion of the plates, driven by pressure differentials and restored by the single spring or magnetic repulsion, continues to convert mechanical energy into output through the motion converter in the same manner as dual-spring embodiments.

In certain embodiments, the oscillating system may be equipped with mechanical or electronic control mechanisms to regulate the timing, speed, and activation state of the device. These controls may include adjustable valves, pressure sensors, or programmable actuators that influence the pressure balance between the chambers or modulate the repelling force of electromagnets or springs. By adjusting these parameters in real-time, the operator can increase or decrease the frequency of oscillation, pause or resume motion, or synchronize the device's operation with external systems. Such regulation enables the apparatus to serve in dynamic applications, including transportation or industrial machinery, where variable speed and responsive control are essential.

Each version of this invention can operate without combustion, electronics, or any form of external fuel once the initial motion is triggered. All motion is sustained purely by the internal dynamics of gas pressure and spring rebound. This makes the invention especially useful in situations where external power is unavailable or undesirable. Potential applications include off-grid power systems, backup generators, remote sensors, electric mobility devices, and low-maintenance mechanical tools. Due to its sealed construction and simple mechanical operation, the invention is well-suited for environments requiring long operational lifespans, minimal servicing, or protection against environmental hazards such as dust, moisture, or temperature extremes.

In high-performance implementations, if the internal pressure differential is sufficiently large and the restoring spring or repelling mechanism is tuned for rapid recovery, the system can generate oscillating motion at frequencies exceeding one cycle per second. Under such conditions, the magnitude and timing of the mechanical energy produced may be comparable to or even exceed that of conventional gasoline engines or electric motors across a wide range of applications—from high-power to low-power demands. Because the invention operates entirely without combustion or external electricity, it produces zero carbon dioxide emissions and can function indefinitely within a sealed environment, limited only by material durability and seal integrity. This enables the invention to act as a clean, closed-loop energy source capable of replacing or supplementing traditional fossil fuel systems in contexts where sustainability, long operational lifespan, or energy autonomy is critical.

By adjusting the internal spring strength, the gas type, the size and material of the plates, and the properties of the sealing membrane, the system can be fine-tuned for a wide variety of performance profiles. For example, a version optimized for low-frequency, high-force output could use stiffer springs and heavier plates, while a version targeting high-speed oscillation might employ lighter materials and a more elastic joint. The invention is thus highly customizable and scalable, from small-scale units powering microdevices to large-scale implementations capable of driving substantial mechanical or electrical loads.

In certain implementations, multiple instances of the invention may be operated in tandem to increase total mechanical or electrical output. These units may function in parallel—each producing independent oscillating motion and feeding into a shared or distributed power system—or may be mechanically or electronically synchronized to enhance efficiency, balance loads, or regulate combined output. Arrays of the invention may be employed in grid-free power networks, electric vehicle platforms with modular drive sections, or multi-axis propulsion systems. Control systems may be used to coordinate the timing and locking behavior of each unit, enabling synchronized operation, load shifting, or staged oscillation for more continuous energy delivery. The modular nature of the invention allows for scalable deployment, from single-unit applications to large-scale implementations involving numerous synchronized oscillators.

In summary, this invention provides a novel, sealed, mechanically self-sustaining energy system based on gas pressure and spring interaction. It is intended that all configurations, components, and design alternatives described herein be interpreted broadly, and that the scope of the invention encompass all legally permissible variations, equivalents, and substitutions that one skilled in the art may derive or infer from this disclosure under applicable United States patent law. It consists of a core design involving two plates joined by a flexible joint and actuated by springs, all sealed within a housing with two gas-filled chambers. The plates oscillate between V-shaped configurations in response to pressure differentials, generating mechanical motion that can be harvested and used. The system is modular, scalable, and adaptable to a wide range of applications and environments, with several variants providing additional performance or structural benefits.

The invention claimed is:

1. A sealed mechanical energy system comprising:

a housing defining an internal chamber divided into an upper chamber and a lower chamber by a movable partition;

the movable partition comprising at least two rigid plates connected by a flexible joint, the plates movable between an upward-facing V-shape and a downward-facing V-shape;

a sealing membrane and/or joint-specific sealing structures extending from a perimeter of the plates, and/or positioned around pivot joints and edges, to the interior surface of the housing, maintaining gas isolation between the upper and lower chambers;

at least one spring assembly connected to at least one of the plates and mounted on a linear track, configured to bias the plates into the V-shape;

wherein movement of the plates into the upper or lower chamber changes the volume of that chamber and increases internal pressure, thereby applying force through the flexible joint to transition the plates into a flat configuration and subsequently into an opposite V-shape; and a motion conversion mechanism mechanically connected to the spring assembly and configured to convert oscillating movement of the plates into rotary or electrical energy output.

2. The system of claim 1, wherein the flexible joint between the plates comprises a sealed pivot joint allowing angular movement while maintaining a gas-tight barrier.

3. The system of claim 1, wherein each spring assembly comprises a linear spring mounted horizontally and constrained to move along a single axis without rotation.

4. The system of claim 1, further comprising a second spring assembly symmetrically arranged on an opposite side of the housing and coupled to the other plate.

5. The system of claim 1, further comprising a limiter structure fixed inside the housing to restrict maximum inward compression of the plates and prevent over-collapse of the V-configuration.

6. The system of claim 1, further comprising a locking mechanism configured to temporarily restrain motion of the spring assembly during at least part of an oscillation cycle.

7. The system of claim 6, wherein the locking mechanism is electronically actuated based on input from pressure sensors or motion detectors.

8. The system of claim 1, wherein the motion conversion mechanism comprises a crankshaft, cam system, gear assembly, or alternator configured to output electrical or rotary power.

9. The system of claim 1, further comprising a third plate disposed between the two rigid plates, the third plate connected to each of the two plates by a respective pivot joint, wherein the third plate enables synchronized tilting and enhances structural balance during oscillation.

10. The system of claim 1, further comprising a gas refill inlet port with a pressure-regulated valve configured to introduce additional gas into one or both chambers if leakage is detected.

11. The system of claim 1, wherein the system is configured to operate with only one active spring assembly, and the opposing plate is connected to a hinged wall or passive joint.

12. The system of claim 1, wherein multiple systems are operated in tandem and coordinated electronically or mechanically to scale output and maintain synchronous motion.

13. The system of claim 1, wherein the sealing membrane comprises a flexible, foldable, gas-impermeable material secured around each pivot joint and/or perimeter connection using one or more of: industrial adhesives, embedded retention channels, heat-sealed or solvent-welded seams, mechanical clamps, compression rings, groove-lock inserts, integrally molded weld lips, or other sealing means compatible with angular motion and high-pressure operation.

14. A method of generating mechanical or electrical power using an internal pressure-driven oscillating system, comprising:

sealing a gas within upper and lower chambers of a housing, the chambers separated by a movable partition formed of two or more plates joined by a flexible joint;

biasing the plates into a V-shape using at least one spring or repelling magnetic force;

increasing internal pressure in one of the chambers by decreasing its volume through V-shape intrusion, while simultaneously increasing the volume of the opposite chamber, thereby exerting force against the V-shaped plates through the flexible joints and causing the plates to transition outward into a flat configuration and continue into an opposite V-shape, while simultaneously compressing the spring;

allowing the compressed spring to decompress and drive the plates back, initiating continued oscillation; and extracting usable mechanical or electrical energy from the motion of the plates via a motion conversion mechanism.

15. The method of claim 14, further comprising electronically controlling the timing of the oscillation by locking and unlocking the spring at selected intervals using a control unit.

16. The method of claim 14, further comprising maintaining gas pressure stability between the upper and lower chambers by rebalancing pressure via a sealed internal valve or an external gas refill port.

17. A sealed oscillating energy system comprising:

a housing containing two internal chambers filled with gas;

a movable structure within the housing comprising at least two interconnected plates joined by a central flexible joint and positioned to pivot between upward and downward V-shaped configurations;

a sealing membrane extending from the plates to the interior housing walls and along all joints, forming an airtight barrier between the two gas chambers;

at least one energy-restoring element selected from the group consisting of:

(a) a linear spring mounted on a horizontal axis;

(b) a pair of repelling magnets;

(c) an electromagnet with variable control;

a motion restrictor fixed inside the housing to limit over-compression of the plates; and an energy conversion module configured to capture the mechanical motion of the plates and convert it to electrical or rotary output.

* * * * *